(12) United States Patent
Wang

(10) Patent No.: US 6,419,831 B2
(45) Date of Patent: Jul. 16, 2002

(54) WATER PURIFIER METHOD

(75) Inventor: Desheng Wang, Pasadena, CA (US)

(73) Assignee: Ozonaid International, Inc., Boise, ID (US)

(*) Notice: Subject to any disclaimer, the term of this patent is extended or adjusted under 35 U.S.C. 154(b) by 0 days.

(21) Appl. No.: 09/908,315

(22) Filed: Jul. 17, 2001

Related U.S. Application Data

(62) Division of application No. 09/417,421, filed on Oct. 13, 1999, now Pat. No. 6,299,761.

(51) Int. Cl.[7] .................................................. C02F 1/79
(52) U.S. Cl. ........................ 210/668; 210/669; 210/739; 210/760; 210/763; 210/766
(58) Field of Search .................. 210/739, 760, 210/763, 766, 177, 192, 195.1, 199, 205, 206, 668, 669; 422/186.11, 186.12, 186.14, 186.18, 186.19

(56) References Cited

U.S. PATENT DOCUMENTS

| | | | |
|---|---|---|---|
| 5,250,177 A | 10/1993 | Cho | 210/192 |
| 5,364,512 A | 11/1994 | Earl | 204/228 |
| 5,427,693 A | 6/1995 | Mausgrover et al. | 210/639 |
| 5,766,488 A | 6/1998 | Uban et al. | 210/739 |
| 5,851,407 A | 12/1998 | Bowman et al. | 210/759 |
| 5,888,403 A | 3/1999 | Hayashi | 210/695 |
| 6,250,609 B1 * | 6/2001 | Cheng et al. | 261/76 |
| 6,277,291 B1 * | 8/2001 | Burris | 210/760 |
| 6,299,761 B1 * | 10/2001 | Wang | 210/87 |

OTHER PUBLICATIONS

J. Hoigne and H. Bader 1975 Ozonation of Water: Role of Hydroxyl Radicals as Oxidizing Intermediates. Science, 190 (4216): 782–784.

* cited by examiner

*Primary Examiner*—Peter A. Hruskoci
(74) *Attorney, Agent, or Firm*—Thomas R. Lampe

(57) ABSTRACT

Ozone is generated and combined with water. The combined water and ozone are then mixed to provide a substantially homogeneous mixture which subsequently is transported along a confined flow path having a length sufficient to provide substantially complete decomposition of the ozone.

7 Claims, 3 Drawing Sheets

WATER PURIFIER METHOD

This is a division of application Ser. No. 09/417,421, filed Oct. 13, 1999, now Pat. No. 6,229,761.

TECHNICAL FIELD

This invention relates to drinking water purification. The apparatus and method of the invention provide bacterial disinfection, viral inactivation and oxidation of organics. The invention encompasses an economical, lightweight, and compact ozone water purification system that is safe, reliable, effective, and convenient, economical to operate and maintain, and suitable for household use.

BACKGROUND OF THE INVENTION

The 1986 Amendments to the United States Safe Drinking Water Act required the U.S. Environmental Protection Agency to implement regulations requiring disinfection of all public water supplies. The regulations also specified water quality criteria under which filtration of surface waters would be a requirement and listed Giardia Lamblia and viruses among a list of 83 contaminates that would be regulated in drinking water. ozonation is one of many methods used for the purification of water. It is a technology substantially more effective than others. Ozone not only can kill bacteria and viruses, but also oxidize organics such as detergents, pesticides, herbicides, phenols and inorganics such as iron, manganese, organically bound heavy metals, cyanides, sulfides, and nitrates. Ozone has been used to treat ground and surface water in many European cities for years and also is becoming the industry standard for treating bottled water.

Ozone, also referred to as triatomic oxygen, is an unstable gas having life in water of minutes. Oxygen, which is normally bi-atomic, becomes ozone through the addition of a third unstable atom. Ozone, because of its instability, cannot be generated and stored for future use. It must be generated and used for treatment immediately. It is created by one of two generation methods: ultraviolet radiation or corona discharge. of the two, corona discharge produces the substantially higher ozone concentration needed for the removal of complex impurities. Generated ozone is pumped into the water through an ozone diffuser, a stone of fine porosity, creating very small bubbles which rise slowly through the water. The slower the bubbles rise through the water, the greater the amount of ozone transferred to the water.

Most critically for water quality, ozonation does not add chemicals to the water as does chlorine, chlorine dioxide, permanganate, etc. As the ozone passes through the water, the third unstable atom detaches, attacks, and destroys impurities in the water. The residue in the water is pure oxygen, which quickly dissipates. Any excess ozone which is not needed for treatment reverts to simple oxygen.

Two main schemes for ozone reactions in water have been proposed (see J. Hoigne and H. Bader. 1975. Ozonation of Water: Role of Hydroxyl Radicals as Oxidizing Intermediates. Science, 190(4216): 782–784). The first is direct oxidation, which is a selective oxidation of chemical compounds by the ozone molecule. These reactions are quite selective and can take minutes. In the absence of ozone decomposition, the ozone concentration can remain relatively constant over short time intervals. The second scheme relates to oxidation by intermediate radical species where the hydroxyl radical is believed to be the most important of the ozone decomposition products. The hydroxyl radical is highly reactive and has a life span of only a few microseconds in water. The mode of action of ozone on microorganisms is poorly understood. Some studies using bacteria suggested that ozone altered proteins and unsaturated boned of fatty acids in cell membrane, leading to cell lysis. Other studies have suggested that ozone may affect deoxyribonucleic acid (DNA) in the cell, causing cell inactivation. Virus inactivation was reported to be related to attack of protein capsid by ozone.

The ability of ozone to disinfect polluted water was recognized as early as 1886. Ozonation might have become universal for disinfection in water treatment except for the introduction of cheap chlorine gas. Recently, however, concern has been expressed about possible toxic effects of chlorine to human health. In search for alternatives to chlorine, ozone is being considered.

Ozone is toxic and dangerous to human, animal and plant life, including aquatic forms. Conventional bottled drinking water production systems consist of three major components: the ozone generator, ozone water mixer and offgas ozone destroyer. Although bottled drinking water is disinfected by ozonation, it is still quite possible that the bottled drinking water can be polluted by a secondary contamination occurring during sealing, transporting, storing and using the product. It is known that bacteria and viruses multiply fast, especially when bacteria and virus inhibiting substances are removed from bottled drinking water. Sometimes the level of bacteria and viruses in bottled drinking water actually may be higher than that of tap water if the bottled drinking water is stored for a long time.

Ideally, it is better to drink fresh, bacteria free, clean water. Therefore, an effective ozone water purifier suitable for household use is highly desirable. In an industrial bottled drinking water production system, the design of ozone water mixer and offgas ozone destroyer is relatively easy because there is no space limitation. However, for small ozone water purifiers suitable for household use, designing a compact device is not simple without sacrificing the quality of purified drinking water. In a thermal ozone destruction unit, the offgas is heated to a prescribed temperature, typically between 300° C. and 350° C. for a short period of time. Such a unit can not be employed in a compact ozone water purifier suitable for household use. Major components of household devices and appliances are often made of plastics for economic and other reasons, and these materials usually cannot withstand such high temperatures.

In ozonation systems disinfection efficiency depends on the dose of ozone injected in water, ozone and water mixing, ozone and water contact time and reaction rate between ozone and water impurities. High dose of ozone, homogeneous mixing, long contact time and fast reaction rate between ozone and water impurities are essential to achieve high disinfection efficiency.

U.S. Pat. No. 5,427,693 discloses an apparatus used for treating contaminated water. A 50 to 200 feet length of tubing is used to enhance the contact time. Obviously, using such a long tubing is not practical in household drinking water purification because of space limitations. U.S. Pat. No. 5,250,177 also uses a long tubing to enhance the contact time. However, use of tubing only will not achieve high disinfection unless very long tubing is used. U.S. Pat. No. 5,851,407 discloses an apparatus using ozone and hydrogen peroxide for water decontamination. One type of static mixer is disclosed. While the effectiveness of disinfection is allegedly enhanced, the contact time is not enough for drinking water purification. U.S. Pat. No. 5,766,488 discloses an apparatus in which the ozonizer serves as a static mixer. This apparatus is believed too complicated and costly to be used in households. U.S. Pat. No. 5,888,403 utilizes a complicated static mixer for ozone and water mixing. Each of the patents referenced above only emphasizes one of the factors which affect disinfection effectiveness. However, all the factors have to be optimized in order to achieve high disinfection.

The known prior art fails to teach or even suggest the combinations of structural elements and method steps disclosed and claimed herein which cooperate to provide a highly efficient, inexpensive approach for ozone treatment of water which is practical and suitable for household as well as other uses.

SUMMARY OF THE INVENTION

It is an object of the invention to provide a system including a compact apparatus that produces superior disinfection and oxidation of organics and inorganics in water and which is suitable for household and other uses.

The water purifier apparatus of the present invention includes an ozone generator and a source of water.

Fluid combining means is incorporated in the apparatus for receiving ozone from the ozone generator, for receiving water from the source of water and for introducing the ozone into the water.

Fluid mixer means is provided for mixing the water and ozone received by the fluid combining means to provide a substantially homogeneous mixture of water and ozone.

The apparatus also includes fluid flow path defining means forming a confined flow path for receiving the substantially homogeneous mixture of water and ozone from the fluid mixer means. The confined flow path has a length sufficient to provide substantially complete decomposition of the ozone in the homogeneous mixture of ozone and water passing therethrough. The fluid flow path defining means has an exit for water in the confined flow path after substantially complete decomposition of the ozone in the substantially homogeneous mixture of ozone and water has occurred.

The fluid mixer means comprises an inline static mixer providing substantially complete transverse mixture uniformity with minimal longitudinal mixing of the combined water and ozone passing through the fluid mixer means.

The water purifier apparatus also includes a catalyst holder having an inlet and an outlet and defining a holder interior accommodating at least one catalyst. The catalyst holder is located downstream from the fluid mixer means and receives and treats the substantially homogeneous mixture of water and ozone from the fluid mixer means.

The invention also encompasses a method. According to the method, ozone is generated and introduced into water. After this step, the water and ozone are mixed to provide a substantially homogeneous mixture of water and ozone.

The substantially homogeneous mixture of water and ozone is introduced into a confined flow path.

The substantially homogeneous mixture of water and ozone flows through the confined flow path for a period of time sufficient to provide substantially complete decomposition of the ozone in the substantially homogeneous mixture of ozone and water so that no offgas ozone destruction is required after the water from the substantially homogeneous mixture of ozone and water exits the confined flow path.

Other features, advantages and objects of the present invention will become apparent with reference to the following description and accompanying drawings.

BEST MODE FOR CARRYING OUT THE INVENTION

Figure 1:
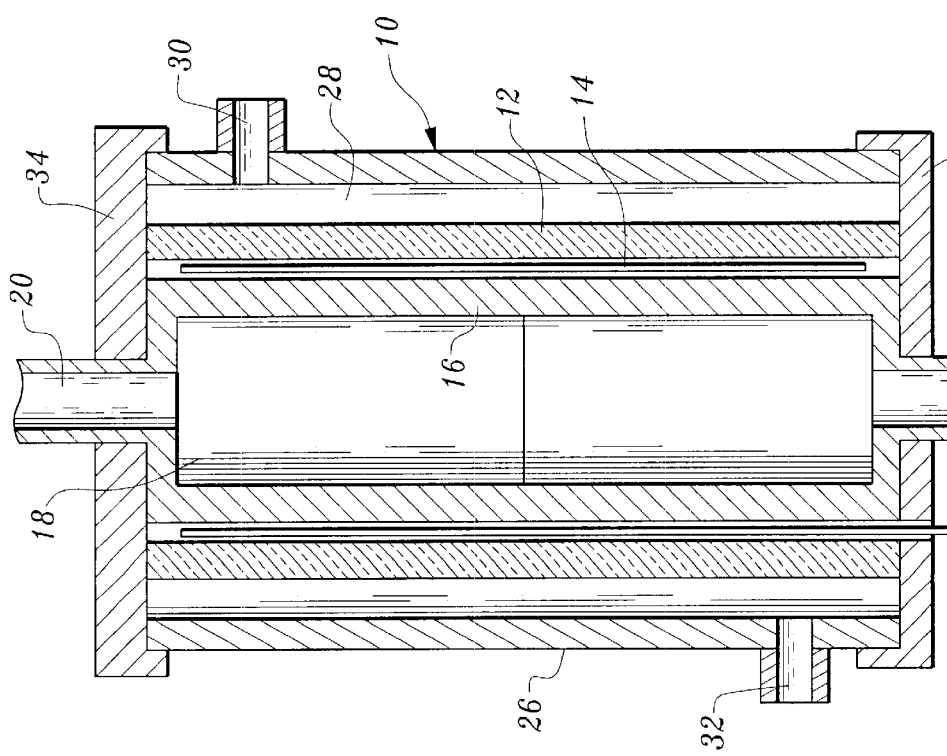
FIG. 1 is a cross-sectional, elevational view of the ozone generator of the apparatus.

Referring now to the drawings, apparatus of the present invention incorporates an ozone generator 10. As shown in FIG. 1, the ozone generator 10 includes a tube 12, preferably formed of glass. An inner cylindrically-shaped electrode 14 constructed of stainless steel is in contact with the inner wall of tube 12. An aluminum oxide jacket 16 is maintained in contact with the inner wall of electrode 14. As will be described in greater detail below, cooling water passes through a passageway 18 defined by jacket 16 for cooling the inner electrode 14. Conduits 20, 22 are formed at the ends of jacket 16 to provide fluid flow communication with the passageway 18.

The ozone generator 10 also includes an outer cylindrically-shaped electrode 26, suitably formed of stainless steel. The outer electrode 26 is grounded and an annular space 28 is formed between glass tube 12 and electrode 26.

Oxygen-containing gas is fed into annular space 28 through gas inlet 30 and ozonized gas exits the ozone generator through outlet 32. End caps 34 maintain the above-described components of the ozone generator properly fixedly positioned relative to one another.

When a high voltage is applied across the inner and outer electrodes, silent discharge occurs therebetween so as to produce ozone in the oxygen-containing gas in space 28.

The ozone generator is associated with a power supply unit 36 which may, for example, have a 30W and 15 KV capacity. Glass tube 12 may suitably have a 22 mm diameter and thickness of 1 mm to act as a dielectric medium. The outer electrode 26 suitably may have a 25 mm inner diameter, carrier air or gas passing through the discharge space between the two electrodes being exposed to a fixed voltage of 15 KV.

Figure 2:
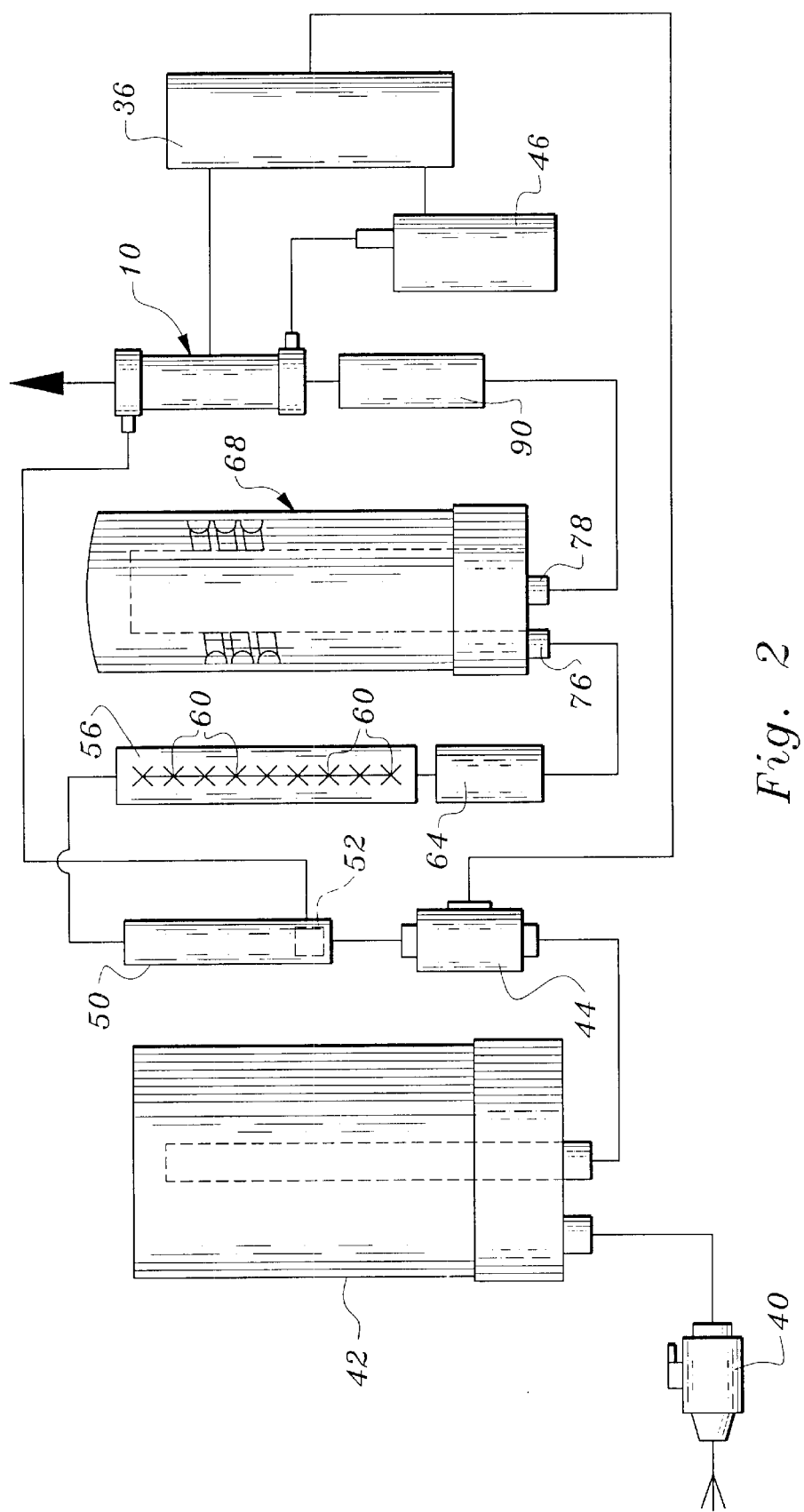
FIG. 2 is a schematic view of a preferred embodiment of the water purifier apparatus.

The apparatus can inexpensively and readily treat water such as tap water flowing from a source of water indicated by water valve 40 in the arrangement depicted in FIG. 2. Water from source 40 passes through and is purified by an activated carbon filter 42. After passing through the filter 42, the water flows through a water sensor 44 of any suitable construction and type which is employed to sense the presence of water at that location. Once the presence of water is sensed by water sensor 44 a signal will be sent from the sensor to power supply 36 which in turn energizes ozone generator 10. Also activated is an air compressor 46 which serves to direct oxygen-containing gas to the inlet of ozone generator 10.

Ozonated gas from the ozone generator 10 flows to a container 50 of the apparatus which receives water from water sensor 44. Generated ozone is pumped into the water by the air compressor 46 through a stone 52 of high porosity, creating very small bubbles which rise slowly through the water in the interior of container 50. The slower the rate of bubble rise through the water, the greater the amount of ozone transferred to the water.

Figure 3:
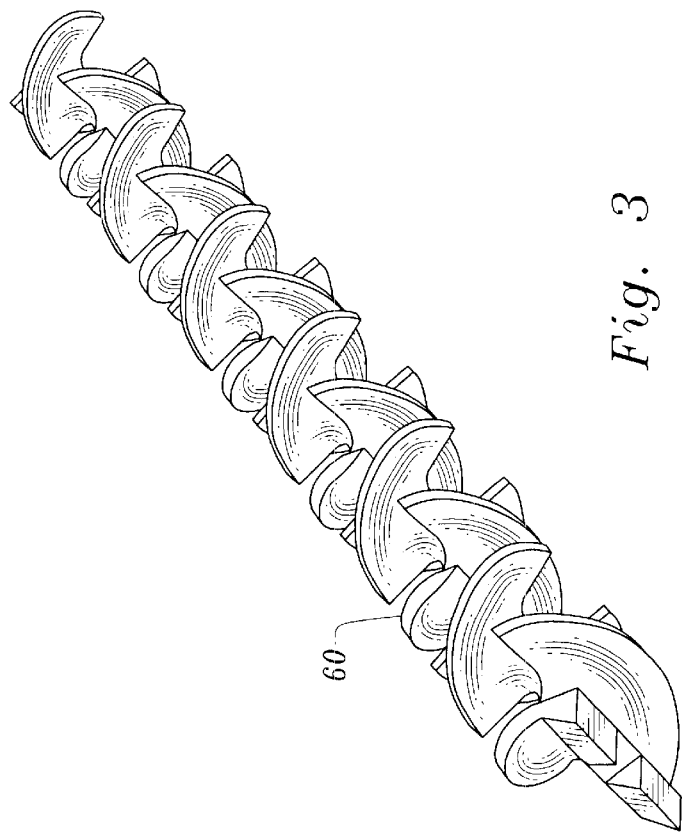
FIG. 3 is a perspective view of a mixing element of an inline static mixer employed in the apparatus.

The water and ozone flow from container or vessel 50 into a fluid mixer in the form of inline static mixer 56 which includes a pipe housing one or more inline static mixer elements of the type shown in FIG. 3. The static mixer element is identified by reference numeral 60 and a plurality thereof are shown diagrammatically in FIG. 2. The static mixer elements employed provide complete transverse uniformity and minimize longitudinal mixing; therefore, their performance approaches perfect plug flow conditions. Static mixer elements of this type are known and available commercially. For example, ConProTec Inc. makes available an MS 13-32 static mixer element suitable for use when practicing this invention. The mixer elements of the inline static mixer alternately divide and recombine fluids passing therethrough. As a result they create shearing action at the cost of pressure drop which, in the present instance, causes both a mixing of water and ozone and an increase in water/ozone contact time. By way of illustration, sixteen mixer elements of the type shown in FIG. 3 have been employed inline to produce the desired results. The mixer elements can be made by the thermal plastic injection molding process. The mixing performance is excellent and the cost is low.

The ozonated water passes through catalyst material (not shown) in the interior of a catalyst holder 64 having an inlet and an outlet. The catalyst holder is located downstream from the fluid mixer 36 and the catalyst material may, for example, consist of silver powder or ceramic powder coated with silver, manganese oxide, etc. Large amounts of bacteria and viruses are absorbed on the surfaces of the catalysts, killed by ozone and desorbed from the surfaces of the catalyst material; therefore, new bacteria and viruses in the water can be continuously absorbed. The contact time between the ozone and the bacteria and viruses is increased due to passage through the catalyst holder and the reaction rate between ozone and impurities such as bacteria and viruses in water is enhanced by the catalytic process.

From catalyst holder 64 the conveyed mixture enters a unit 68 that serves the dual purpose of forming a relatively lengthy confined flow path for the substantially homogeneous mixture and acting as a filter for the water thereof. The confined flow path may, for example, have a length in the order of seven meters or so. By employing this long confined path, the period of contact between ozone and water can be further increased. For example, depending upon component sizes, flow rates and other considerations, contact time can be extended one minute or more.

It is known that ozone is not a stable molecule. It may be decomposed by collision induced dissociation; the longer the path the more likely that the ozone can be consumed by reaction with impurities in the water and be decomposed. In the present invention, large amounts of ozone are consumed by operation of the inline static mixers previously described, only relatively small amounts of ozone passing through the confined flow path of unit 68 which serves as an additional ozone/water mixer and offgas ozone destroyer by utilizing the collision induced dissociation process. This means that no high temperature and relatively expensive offgas ozone-destroyer mechanism need be employed as is the case in conventional ozone water purification systems.

Figure 4:
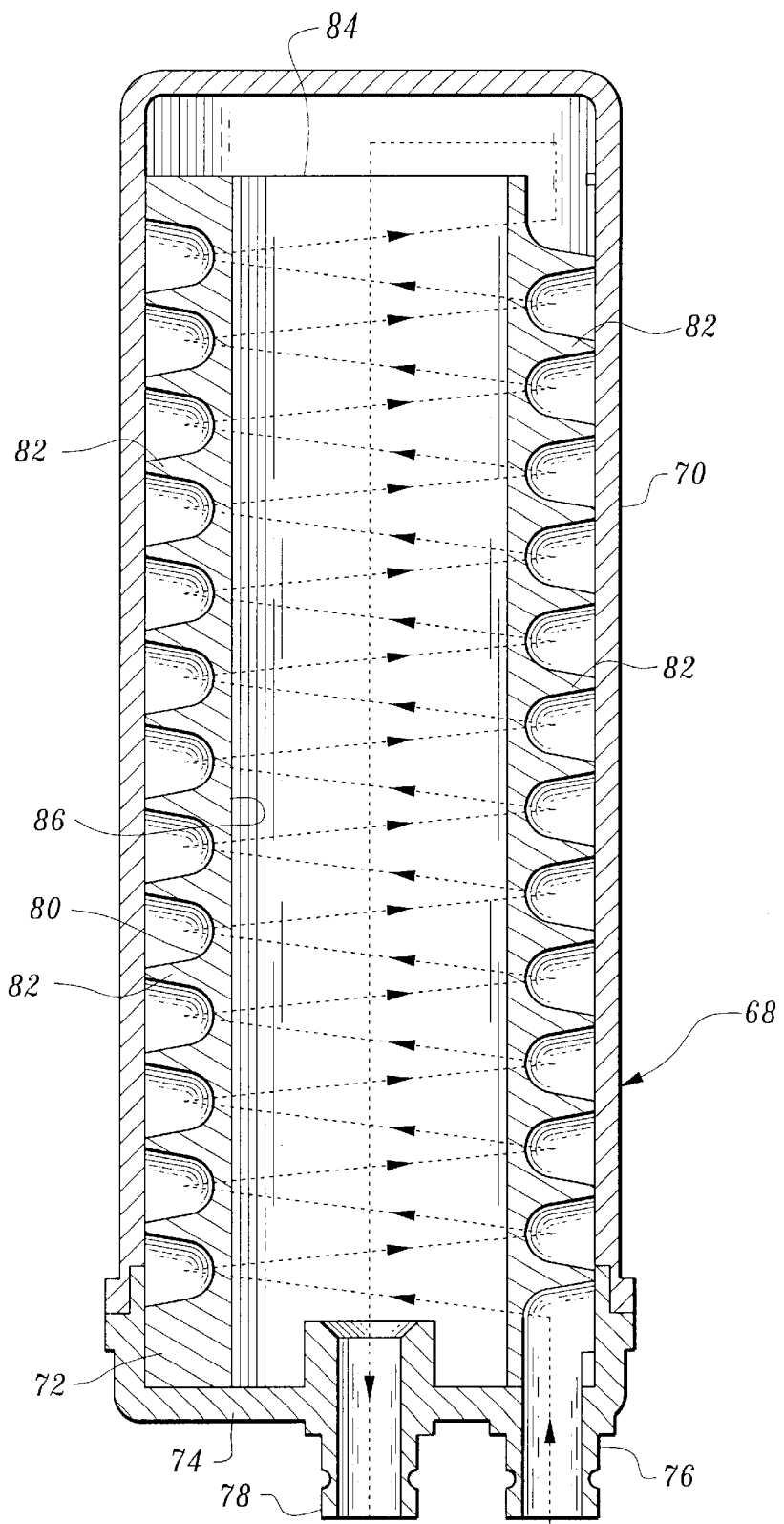
FIG. 4 is a cross-sectional, elevational view of a component of the invention defining a fluid flow path and including a filter for receiving water from the flow path.

FIG. 4 discloses the components and operation of unit 68. More particularly, unit 68 is of unitary structure and includes an outer housing segment 70 and an inner housing segment 72. The inner housing segment 72 is positioned within the interior of the outer housing segment. Both housing segments are connected to a base 74 having an inlet 76 and an outlet 78. The base and housing segments are suitably formed of molded plastic. Unit 68 is in the nature of a unitary cartridge which may suitably be releasably connected by means of inlet 76 and outlet 78 to the rest of the apparatus. The inlet and outlet have annular grooves to accommodate O-rings to provide a fluid-tight seal at the connection location.

A helical groove 80 is formed about the outer periphery of inner housing segment 72. The helical raised portions 82 of the inner housing segment defining the groove bear against the inner surface of outer housing segment 70.

The water/ozone mixture from catalyst holder 64 enters inlet 76 as shown by the dash lines with arrows in FIG. 4 and enters the confines of the helical groove. The mixture moves around the inner housing segment within this enclosed, lengthy passageway until it exits at the upper end of the inner housing segment. Flow then moves downwardly within an activated charcoal filter 84 positioned within chamber 86 of inner housing segment 72. The filtered water exits the unit 68 through outlet 78.

The water exiting the filter 84 is virtually free of ozone and no offgas ozone destroyer need be employed with the apparatus.

From unit 68 the treated water proceeds to a flow meter 90 which is used to monitor the quality of purified water and remind the user when one or more of the activated carbon filters should be changed. With respect to filter 84, this is readily accomplished by providing screw threads or some other means to allow removal of the outer housing segment from base 74 so that access is had to the chamber 86 holding the filter.

After passing through flow meter 90 the water progresses to ozone generator 10, flowing through conduit 22 through passageway 18 and then out of the ozone generator through conduit 20 for use by the consumer. As mentioned above, this water flow helps cool the ozone generator components.

What is claimed is:

1. A method of purifying water comprising the steps of:

generating ozone;

combining said ozone with flowing water;

introducing the combination of ozone and water into a fluid mixer having an inline static mixer including a static mixer housing defining a static mixer housing interior and at least one inline static mixer element in said static mixer housing interior;

flowing the combination of ozone and water through said static mixer housing interior and past the at least one inline static mixer element;

during flow of the combination of ozone and water past the at least one inline static mixer element, engaging the at least one inline static mixer element with the combination of ozone and water to provide substantially complete transverse mixture uniformity with minimal longitudinal mixing of the combination of ozone and water to create a substantially homogeneous mixture of water and ozone;

during engagement of the at least one inline static mixer element by the combination of ozone and water, consuming at-least some of the ozone in the combination of ozone and water;

after creation of said substantially homogeneous mixture of water and ozone by said fluid mixer, introducing said substantially homogeneous mixture of water and ozone into a confined flow path having an exit and further having a length sufficient to provide substantially complete decomposition of the ozone in the substantially homogeneous mixture of water and ozone;

flowing the substantially homogeneous mixture of ozone and water through the confined flow path to provide substantially complete decomposition of the ozone in the substantially homogeneous mixture of water and ozone so that no ozone requiring off gas destruction exits from said confined flow path; and after substantially complete decomposition of the ozone in the homogeneous mixture of water and ozone, causing the water thereof to pass through said exit.

2. The method according to claim 1 including the step of passing the substantially homogenous mixture of water and ozone through at least one catalyst to absorb bacteria and viruses in the substantially homogenous mixture of water and ozone.

3. The method according to claim 1 wherein the step of combining the ozone with the water is carried out by introducing the ozone in bubble form in the water.

4. The method according to claim 3 wherein the ozone is converted into bubble form by pressurizing the ozone and passing the pressurized ozone through a porous body in the water.

5. The method according to claim 1 including the step of filtering the water before the step of introducing ozone into the water.

6. The method according to claim 1 including the step of filtering the water after the ozone in the substantially homogenous mixture of water and ozone has substantially completely decomposed.

7. The method according to claim 1 including the step of filtering the water caused to pass through said exit.

* * * * *